United States Patent [19]

Goldin et al.

[11] 4,311,950
[45] Jan. 19, 1982

[54] EXCITATION SYSTEM FOR A SYNCHRONOUS MACHINE

[76] Inventors: Rodion G. Goldin, ulitsa Mamina-Sibiryaka, 8, kv. 56; Vladimir Y. Tukhman, ulitsa Agronomicheskaya, 16, kv. 23; Valentin G. Yakimenko, ulitsa Taganskaya, 48, kv. 89, all of Sverdlovsk, U.S.S.R.

[21] Appl. No.: 134,870

[22] Filed: Mar. 28, 1980

[51] Int. Cl.³ .................... H02P 1/46; H02P 5/28
[52] U.S. Cl. ......................... 318/718; 318/716
[58] Field of Search ............... 318/716, 717, 718, 731, 318/732, 766, 821, 822

[56] References Cited

U.S. PATENT DOCUMENTS

| | | | |
|---|---|---|---|
| 3,449,652 | 6/1969 | Ishizaki | 318/718 |
| 3,539,890 | 11/1970 | Zechlin | 318/718 |
| 4,106,069 | 8/1978 | Trautner et al. | 318/716 X |

FOREIGN PATENT DOCUMENTS

| | | | |
|---|---|---|---|
| 30637 | 3/1956 | Fed. Rep. of Germany | 318/731 |
| 1210481 | 2/1966 | Fed. Rep. of Germany | 318/716 |
| 2426562 | 12/1975 | Fed. Rep. of Germany | 318/716 |
| 1396784 | 6/1975 | United Kingdom | 318/823 |

OTHER PUBLICATIONS

Vershinin, P. P., Hashper, L. Ya. "Synchronous Machines in Metal-Making", Moscow, 1974.
"Catalogue of Series KTU Complete Thyristor Devices", OKP. 341.631, Tallin, 1978.

*Primary Examiner*—J. V. Truhe
*Assistant Examiner*—Richard M. Moose
*Attorney, Agent, or Firm*—Burton L. Lilling

[57] ABSTRACT

An excitation system for a synchronous machine comprising an exciter having its output connected through a current relay in parallel with a starting-protecting unit. The starting-protecting unit includes parallel branches, each comprising a series-connected resistor and thyristor switch having a voltage-sensitive threshold element connected between its anode and gate. A turn-on unit for the parallel branches of the starting-protecting unit includes a voltage-sensitive overvoltage detector connected in parallel with the exciter output, in which the voltage setting is lower than that of the threshold element of the parallel branches of the starting-protecting unit. A memory unit; and a pulse-forming unit. The output of the overvoltage detector is connected through the memory unit to the input of the pulse-forming unit. The output of the pulse-forming unit is connected via the contacts of the current relay to the gates of the thyristor switches in the parallel branches of the starting-protecting unit.

2 Claims, 1 Drawing Figure

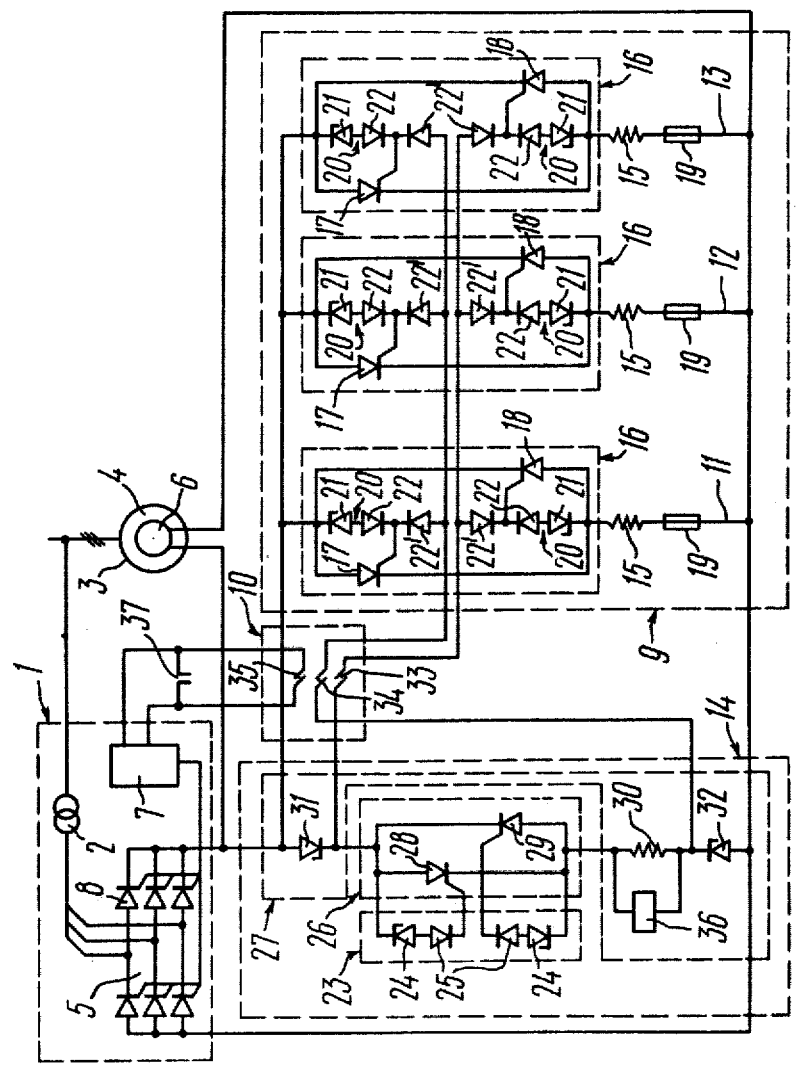

EXCITATION SYSTEM FOR A SYNCHRONOUS MACHINE

BACKGROUND OF THE INVENTION

1. Field of the Invention

This invention relates to electrical engineering and more particularly, to excitation systems for synchronous machines. By the excitation system described herein is meant a set of devices intended to supply a field winding with an automatically controlled direct current, to protect the field winding and an exciter against overvoltage during transients in a synchronous machine, and to perform some other functions.

2. Description of the Prior Art

Hitherto, an excitation system for a synchronous machine has been made up of an exciter having its output coupled to a starting-protecting unit comprising a resistor connected in series with a thyristor switch controlled by a voltage-sensitive threshold element that can be made to operate at a certain voltage setting (Vershinin P. P., Hashper L. Ya. "Synchronous Machines in Metal-Making", Moscow, 1974).

This excitation system is insufficiently reliable because any failure in the starting-protecting unit (an open circuit, loss of control, or short-circuited thyristor switch) entails the risk of an emergency shut-down of or damage to the exciter and the synchronous machine.

Another approach has been an excitation system for a synchronous machine, comprising an exciter with its output connected to a starting-protecting unit containing parallel branches, each consisting of a resistor connected in series with a thyristor switch in which a voltage-sensitive threshold element is connected between the anode and the gate ("Catalogue of Series KTU Complete Thyristor Devices" OKP. 341.631, Tallin, 1978).

This excitation system is more reliable because an open circuit in one of the parallel branches, provided the other branches operate normally, will not cause the excitation system to lose its protection functions, and, as a consequence, no emergency shut-down of the exciter and the synchronous machine will be required.

The presence of the parallel branches, however, makes less reliable the starting of the synchronous machine and some other modes of operation accompanied by the flow of considerable currents through the starting-protecting unit, becuase the threshold elements controlling the thyristors of the thyristor switches differ in voltage setting and thyristor turn-on time. Just as the first parallel branch of the starting-protecting unit is energized (for example, in starting the synchronous machine), the voltage across the field winding of the synchronous machine drops so that the remaining parallel branches of the starting-protecting unit can be energized with difficutly or, sometimes, not at all. As a result, one parallel branch takes all of the starting current, is overheated, and impairs the reliability of the entire excitation system.

SUMMARY OF THE INVENTION

An object of this invention is to improve the reliability of an excitation system by ensuring that the parallel branches of a starting-protecting unit are all energized at the same time in the case of an overvoltage across a field winding during transients in a synchronous machine.

There is provided an excitation system for a synchronous machine, comprising an exciter connected to a field winding of the synchronous machine and having its output coupled through a current relay in parallel with a starting-protecting unit containing parallel branches. Each parallel branch includes a series-connected resistor and thyristor switch having its anode and gate connected to a voltage-sensitive threshold element that can be made to operate at a certain voltage setting. According to the invention, a turn-on unit for the parallel branches of the starting-protecting unit, includes an overvoltage detector connected in parallel with the exciter output output and having its voltage setting lower than that of the voltage-sensitive threshold element in the thyristor switch of the starting-protecting unit, a memory unit, and a pulse-forming unit. The output of the overvoltage detector is connected via the memory unit to the input of the pulse-forming unit, whose output is coupled through the contacts of a current relay to the gates of the parallel-branch thyristor switches in the starting-protecting unit.

It is advisable that in the excitation system, according to the invention, the memory unit and pulse-forming unit circuits be combined into a single circuit and be built of a thyristor and a resistor connected in series.

This excitation system for a synchronous machine, having the turn-on unit for the parallel branches of the starting-protecting unit, ensures that the parallel branches are all energized at the same time during transients in the synchronous machine associated with overvoltages appearing across the field winding of the synchronous machine, and prevents the parallel branches of the starting-protecting unit from being energized should any one of the branches or the starting unit itself be faulty, thereby improving the reliability of the excitation system for the synchronous machine.

BRIEF DESCRIPTION OF THE DRAWINGS

The invention will be described in detail, by way of example, with reference to the accompanying drawing which is a schematic circuit diagram of the excitation system according to the invention.

DETAILED DESCRIPTION OF THE INVENTION

The excitation system for a synchronous machine comprises, according to the invention, an exciter 1 including a transformer 2 connected to a stator winding 3 of the synchronous machine 4, a converter 5 having its input coupled to the transformer 2 and its output coupled to a field winding 6 of the synchronous machine 4, and a control system 7 with its output connected to the gates of the thyristors 8 in the converter 5. Across the output of the converter 5 is placed a starting-protecting unit 9. To monitor the value of the current in the starting-protecting unit 9, the excitation system includes a current relay 10 intended to signal the exciter 1 about the presence of current in the starting-protecting unit.

The starting-protecting unit 9 contains parallel branches 11, 12 and 13. The number of branches depends on the power rating of the synchronous machine 4 and redundancy requirements, for example, it may be required that the synchronous machine 4 should be started with one parallel branch of the starting-protecting unit 9 de-energized. The excitation system also contains a turn-on unit 14 for the parallel branches 11, 12 and 13, intended to energize all of them at the same time. Each of the parallel branches 11, 12 and 13 contains a series-connected resistor 15, a thyristor switch 16 based on thyristors 17 and 18 connected in parallel opposition, and a device 19 for open-circuiting the parallel branch under fault conditions (in this case, a fuse). Between the anode and gate of the thyristors 17 and 18 of each parallel branch is placed a threshold element 20 comprising a Zener diode 21 and a diode 22 connected in series opposition. The gates of the thyristors 17 and 18 are connected to the cathode of a diode 22' which, as well as the diode 22, is intended to decouple (isolate) the threshold element 20 from the turn-on unit 14.

The turn-on unit 14 for the parallel branches 11, 12 and 13 comprises an overvoltage detector 23 built of Zener diodes 24 and diodes 25, a memory unit 26 and a pulse-forming unit 27.

The memory unit 26 and the pulse-forming unit 27 are interconnected and based on thyristors 28 and 29 connected in parallel opposition and coupled in series with a resistor 30 and Zener diodes 31 and 32. Between the anodes and gates of the thyristors 28 and 29 are placed the Zener diodes 24 and the diodes 25. The voltage setting of the Zener diodes 24 is higher than the input voltage of the converter 5, but lower than the voltage setting of the Zener diodes 21.

The current relay 10 uses sealed-reed contacts 33, 34 and 35. The sealed-reed contacts 33 and 34 connect the cathodes of the Zener diodes 31 and 32 to the gates of the thyristors 18 and 17 of the parallel branches 11, 12 and 13, respectively.

The resistor 30 is shunted by a relay 36 intended to monitor the current in the thyristors 28 and 29.

The sealed-reed contact 35 and the output contact 37 of the relay 36 are connected to each other in parallel and also to the input of the control system 7 of the converter 5.

The excitation system of the invention operates as follows. In the normal mode of operation, the output voltage of the exciter 1 is lower than the voltage setting of the Zener diodes 24 and 21, therefore the starting-protecting unit 9 and the turn-on unit 14 are off. The exciter 1 maintains the normal operation of the synchronous machine 4 in a well known manner, so the operation thereof in this mode will not be described.

During transients in the synchronous machine 4, associated with overvoltages across the field winding 6 of the synchronous machine 4 (induction mode, starting of the synchrono us machine, etc.), when the voltage across the field winding (across the terminals of the excitation system) exceeds the voltage setting of the Zener diodes 24, the Zener diodes 24 turn on and pass current from the anode to the gate of the thyristor 28 (if the voltage induced in the field winding is positive at the moment) or to that of the thyristor 29 (if the voltage induced in the field winding is negative). Assuming the voltage be positive, than the thyristor 28 is rendered conducting, and the circuit comprising the Zener diode 31, the thyristor 28 and the Zener diode 32 conducts current. When a voltage develops across the resistor 30, the relay 36 operates. The Zener diode 32 generates a potential that would be suaficient to turn on the thyristors 17 and 18 of the parallel branches 11, 12 and 13, but the control circuit of these thyristors is opened by the sealed-reed contact 34, so the thyristors 17 and 18 are not driven to conduction.

A further increases in voltage turns on the Zener diode 21 connected in the control circuit of the thyristor 17 of, for example, the parallel branch 11. The circuit comprising the anode of the thyristor 17, the Zener diode 21, the diode 22, the gate of the thyristor 17, and the cathode of the thyristor 17 conducts the control current for the thyristor 17. This current renders the thyristor 17 conducting.

The conducting thyristor 17 connects the resistor 15 of the parallel branch 11 to the field winding 6 of the synchronous machine 4. The parallel branch 11 conducts current, and the voltage across the field winding 6 drops below the voltage setting of the Zener diodes 21 in the parallel branches 12 and 13, and, therefore, the parallel branches 12 and 13 cannot be energized.

The thyristor 28, however, continues to conduct current and the Zener diode 32 remains at a potential sufficient to drive the thyristors 17 to conduction, so, when the parallel branch begins to conduct current and the relay 10 operates, the sealed-reed contact 34 makes contact and connects the pulse-forming unit 27 to the gates of the thyristors 17 of the parallel branches 12 and 13. The thyristors 17 of the parallel branches 12 and 13 turn on and connect the branches 12 and 13 to the field winding 6. As a result, the starting current is shared by all the parallel branches 11, 12 and 13, and the voltage across the field winding 6 decreases still further. If the voltage across the field winding 6 is negative, the above events take place via the thyristor 29 of the turn-on unit 14 and the thyristors 18 of the parallel branches 11, 12 and 13.

After all the transients have died out, that is, after the voltage induced across the field winding 6 of the synchronous machine 4 has dropped below the output voltage of the converter 5, the starting-protecting unit 9 and the turnon unit 14 are de-energized by the sealed-reed contact 35 and the contact 37 of the relay 36 which, affecting the control system 7 in a known manner, instantaneously reduce the output voltage of the converter 5 to zero, thereby speeding up removal of power from the said units 9 and 14.

If, during transients in the synchronous machine 4, the voltage rises insignificantly to a level exceeding the voltage setting of the Zener diode 24, but lying below that of the Zener diode 21, the turn-on unit 14 will operate, and the presence of overvoltage across the circuits of the thyristors 28 and 29 will thus be kept in memory. Since the units 11, 12 and 13 are not energized, no control voltage is applied to the thyristors 17 and 18. When the voltage across the field winding 6 decreases to a level equal to or below the input voltage of the converter 5, the turn-on unit 14 will be switched off by the contact 37 of the relay 36 affecting the control system 7 of the converter 5 in a manner similar to that described above.

Should one of the parallel branches, for example, the parallel branch 11, be faulty due to the breakdown of the thyristor 17, an abnormal ("fault") current will flow through the parallel branch 11 during normal operation of the synchronous machine 4, and the current relay 10 will operate. In this mode of operation, however, the voltage across the field winding 6 is less than the voltage setting of the Zener diode 24, and the parallel-branch turn-on unit 14 will not operate. No control voltage will be applied to the gates of the thyristors 17 and 18 of the parallel branches 12 and 13, and the parallel branches 12 and 13 will remain de-energized, thereby localizing the trouble. The faulty parallel branch 11 is disconnected in a known manner by a device 19 for disconnecting the parallel branches (in this case, a fuse).

Should the turn-on unit 14 develop a fault, for example, due to the breakdown of the thyristor 28, the voltage appearing across the Zener diode 32 will be still sufficient to turn on the parallel branches 11, 12 and 13, but, since no current flows through the parallel branches 11, 12 and 13, the relay 10 is de-energized, and the control voltage is not applied to the gates of the thyristors 17 and 18. The parallel branches 11, 12 and 13 remain de-energized and, as a consequence, the fault in the turn-on unit 14 leads to no abnormal situation. Because the turn-on unit 14 draws little power, the current may flow through the unit 14 for a long time, up to the sheduled stopping of the synchronous machine 4. If this is undesirable, the turn-on unit 14 may be de-energized in a known manner, for example, by a switch (not shown in the drawing) connected in its circuit.

The proposed excitation system has an improved reliability because it ensures that the parallel branches 11, 12 and 13 of the starting-protecting unit 9 are all energized at the same time during transients in the synchronous machine 4, associated with overvoltage across the field winding 6.

The said excitation system prevents the parallel branches 11, 12 and 13 of the starting-protecting unit 9 from being energized when one of them or the turn-on unit 14 is at fault.

The reliable energizing of all the parallel branches 11, 12 and 13 of the starting-protecting unit 9 makes it possible to increase the load current handled by the branches 11, 12 and 13 of the starting-protecting unit 9 and, as a consequence, to reduce the overall dimensions and the weight of both the starting protecting unit 9 and the excitation system as a whole without impairing its reliability.

Because the memory unit 26 and the pulse-forming unit 27 are combined and built of the series-connected thyristor 28 and resistor 30 (or the thyristor 29 and resistor 30), it is possible to simplify the construction of the memory unit 26 and the pulse-forming unit 27, and to eliminate the need for additional power supplies for the units, so that they become self-contained.

What is claimed is:

1. An excitation system for a synchronous machine, comprising:

an exciter having an output connected to a field winding of said synchronous machine;

a starting-protecting unit connected in parallel to said output of said exciter, said starting-protecting unit having parallel branches, each branch containing a series-connected resistor and thyristor switch having a voltage-sensitive threshold element connected between its anode and gate;

a current relay of the starting-protecting unit electrically coupled to said exciter and having contacts; and a turn-on unit for said parallel branches of said starting-protecting unit comprising an overvoltage detector with a voltage setting below that of said threshold element of said thyristor switch of said starting-protecting unit, a memory unit and a pulse-forming unit, said overvoltage detector having an output coupled through said memory unit to an input of said pulse-forming unit, said overvoltage detector being connected in parallel with said output of said exciter, and said pulse-forming unit having an output coupled through said contacts of said current relay to said gates of said thyristor switches in the parallel branches of said starting-protecting unit.

2. An excitation system as claimed in claim 1, wherein said memory unit and said pulse-forming unit are defined by a single circuit including a thyristor and a resistor connected in series with each other.

* * * * *